United States Patent
Frankenberger (10) Patent No.: US 11,708,144 B2
(45) Date of Patent: Jul. 25, 2023

(54) METHOD FOR PRODUCING AN AIRCRAFT FUSELAGE

(71) Applicant: Airbus Operations GmbH, Hamburg (DE)

(72) Inventor: Eckart Frankenberger, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 573 days.

(21) Appl. No.: 16/179,211

(22) Filed: Nov. 2, 2018

(65) Prior Publication Data
US 2019/0135404 A1 May 9, 2019

(30) Foreign Application Priority Data

Nov. 3, 2017 (DE) ...................... 10 2017 125 763.2

(51) Int. Cl.
*B64C 1/06* (2006.01)
*B64F 5/10* (2017.01)
*B64C 1/12* (2006.01)

(52) U.S. Cl.
CPC ............... *B64C 1/069* (2013.01); *B64C 1/12* (2013.01); *B64F 5/10* (2017.01)

(58) Field of Classification Search
CPC ......... B64C 1/066; B64C 1/069; B64C 1/067; B64C 1/12; B64C 1/406; H02G 3/30; H02G 3/36; B64D 2013/0625; B64D 2221/00; B64F 5/10; B66F 9/02; B66F 3/36; Y02T 50/50
See application file for complete search history.

(56) References Cited

U.S. PATENT DOCUMENTS

| | | | | | |
|---|---|---|---|---|---|
| 4,412,774 | A | * | 11/1983 | Legrand | B64F 5/50 180/298 |
| 4,461,455 | A | * | 7/1984 | Mills | B64F 5/50 180/125 |
| 4,699,337 | A | * | 10/1987 | Lewis | B64D 9/00 244/137.1 |
| 6,692,681 | B1 | * | 2/2004 | Lunde | B29C 43/12 156/173 |
| 6,870,139 | B2 | * | 3/2005 | Petrenko | A63C 1/30 219/482 |

(Continued)

FOREIGN PATENT DOCUMENTS

| DE | 10 2007 008 988 A1 | 8/2008 |
|---|---|---|
| DE | 10 2009 015 856 B4 | 1/2012 |
| DE | 10 2006 050 534 B4 | 12/2013 |

OTHER PUBLICATIONS

German Search Report for Application No. 10 2017 125 763.2 dated Apr. 17, 2018.

*Primary Examiner* — Medhat Badawi
(74) *Attorney, Agent, or Firm* — KDW Firm PLLC (57) ABSTRACT

A method for producing an aircraft fuselage for simplifying and accelerating the production of the aircraft fuselage. The method includes providing a fuselage structure which surrounds an interior space and has an inner side facing the interior space, providing an insulating panel for insulating the fuselage structure, wherein the insulating panel has an inner surface and an outer surface, providing a film which is provided with electric strip conductors, fastening the film to the inner surface of the insulating panel, and attaching the insulating panel to the inner side of the fuselage structure.

16 Claims, 4 Drawing Sheets

(56) References Cited

U.S. PATENT DOCUMENTS

| | | | | |
|---|---|---|---|---|
| 6,983,092 B2* | 1/2006 | Kondo | ................... | G02B 6/43 385/24 |
| 7,513,458 B2* | 4/2009 | Layland | ................ | B64D 15/12 244/134 D |
| 8,128,030 B2* | 3/2012 | Dannenberg | ............. | B64C 1/12 244/119 |
| 8,570,152 B2* | 10/2013 | Fahley | .................... | H02J 50/20 340/10.1 |
| 8,602,713 B1* | 12/2013 | Davis | ...................... | B60P 1/34 414/589 |
| 8,661,684 B1* | 3/2014 | Boyd | ....................... | B64F 5/10 29/897.2 |
| 8,844,870 B2* | 9/2014 | Goehlich | .................. | B32B 5/18 244/119 |
| 8,876,048 B2 | 11/2014 | Herrmann et al. | | |
| 9,463,865 B2* | 10/2016 | Frauen | .................... | B64C 1/061 |
| 9,562,828 B2* | 2/2017 | Broughton | ............ | F01D 21/003 |
| 2003/0178765 A1* | 9/2003 | Frankenberger | ....... | B65H 5/228 271/264 |
| 2006/0118235 A1* | 6/2006 | Lum | ....................... | B64F 5/10 156/285 |
| 2006/0273690 A1* | 12/2006 | Frankenberger | .......... | B64C 1/06 310/328 |
| 2008/0185478 A1* | 8/2008 | Dannenberg | .............. | B64C 1/12 244/119 |
| 2008/0250626 A1* | 10/2008 | Frankenberger | .......... | B64F 5/50 29/430 |
| 2011/0006159 A1* | 1/2011 | Herrmann | ................ | B64C 1/067 244/119 |
| 2012/0012218 A1* | 1/2012 | Sabadie | .................. | B64C 1/066 138/106 |
| 2013/0045070 A1* | 2/2013 | Waisanen | ................ | G21C 19/00 414/572 |
| 2013/0200585 A1* | 8/2013 | Hoeper | ................. | B62D 53/005 280/79.2 |
| 2014/0077434 A1* | 3/2014 | Chang | ....................... | B64F 5/50 269/287 |
| 2014/0079905 A1* | 3/2014 | Frankenberger | .......... | B64C 1/40 428/131 |
| 2014/0123462 A1* | 5/2014 | Rollfink | ................ | B64D 11/06 29/428 |
| 2014/0157588 A1* | 6/2014 | Boyd | ........................ | B64F 5/10 29/703 |
| 2014/0167500 A1* | 6/2014 | Frankenberger | .......... | B64C 1/40 307/9.1 |
| 2014/0234552 A1* | 8/2014 | Frankenberger | ....... | H05K 3/222 427/555 |
| 2015/0344346 A1* | 12/2015 | Jiao | ........................ | C03B 35/187 65/29.11 |
| 2016/0221693 A1* | 8/2016 | Davis | ....................... | B62B 3/104 |
| 2017/0120443 A1* | 5/2017 | Kang | ..................... | B25J 9/0084 |
| 2019/0135404 A1* | 5/2019 | Frankenberger | ........ | B64C 1/406 |

\* cited by examiner

METHOD FOR PRODUCING AN AIRCRAFT FUSELAGE

CROSS-REFERENCE TO RELATED APPLICATION

This application claims priority to German Patent Application No. 10 2017 125 763.2 filed Nov. 3, 2017, the entire disclosure of which is incorporated by reference herein.

TECHNICAL FIELD

The present disclosure relates to a method for producing an aircraft fuselage, in particular to a method for producing an aircraft fuselage with an integrated electrical system. Further aspects of the present disclosure relate to an insulating panel for insulating an aircraft fuselage, and to an aircraft of this type.

BACKGROUND

It is known from the prior art, during the production of an aircraft fuselage, first of all to line the inner side of the fuselage structure with insulating mats and subsequently to mount the various aircraft systems, such as electric cable harnesses, air conditioning systems, etc., via the insulating mats. For this purpose, holders have to be guided from the primary structure (e.g. frames, stringers) through slots in the insulating mats. Subsequently, the inner cabin wall with acoustic secondary insulation is fastened over the insulating mats and the systems. However, this design is a complicated working process since insulating mats and systems are attached and adapted manually.

SUMMARY

It is therefore an object of the present disclosure to simplify and accelerate the production of the aircraft fuselage.

This object is achieved with a method as disclosed herein.

First of all, a fuselage structure, in particular fuselage wall, which surrounds an interior space and has an inner side facing the interior space, is provided. The fuselage structure preferably has an outer skin and also frames running in a circumferential direction and stringers running in a longitudinal direction for supporting the outer skin on the inner side.

Furthermore, an insulating panel for insulating the fuselage structure against cold and noise is provided. The insulating panel is preferably formed from a heat- and sound-insulating material, such as rigid foam. The insulating panel has an inner surface and an outer surface and is preferably curved in such a manner that the inner surface is shaped concavely and the outer surface is shaped convexly.

In addition, a film which is provided with electric strip conductors and/or switching elements is provided. The electric strip conductors preferably form an electrical system of the aircraft, which is provided in order to be accommodated in the aircraft fuselage between cabin wall and fuselage structure. The electric strip conductors here can comprise entire electrical systems, including integrated circuits.

The film is fastened, e.g. adhesively bonded, to the inner surface of the insulating panel. Alternatively, film can also be provided with electric strip conductors only after being fastened to the inner surface of the insulating panel.

Subsequently, the insulating panel which is provided with the film is attached to the inner side of the fuselage structure. Alternatively, other structural or cabin elements can also be provided with electrically printed films before they are mounted in the fuselage.

The insulating panels or cabin elements can thereby be substantially premanufactured, and the time-consuming manual work of installing the electrical system can be reduced to a minimum, and therefore the production method can be substantially simplified, accelerated and standardized.

According to a preferred embodiment, after the insulating panel is attached to the inner side of the fuselage structure, a cabin wall segment is attached to the inner side of the fuselage structure in such a manner that the insulating panel extends between the fuselage structure and the cabin wall segment. In this way, no additional electrical systems, such as cabin harnesses, have to be installed before the cabin wall segment is attached.

According to a further preferred embodiment, the film which is provided with electric strip conductors is provided by a film blank composed of electrically insulating material being printed with electric strip conductors. By electric strip conductors being imprinted, complex electrical systems can be realized easily and rapidly on the film.

It is particularly preferred here if the printing takes place with the aid of an inkjet printing device, wherein particles of an electrically conductive material and preferably also particles of an electrically insulating material are applied to the film blank in a predetermined pattern and are subsequently fixed, i.e. in particular are connected and cured. The connection and curing can be carried out, for example, with a laser sintering device. Inkjet printing and laser sintering are effective methods for imprinting the electric strip conductors. As an alternative to the inkjet printing device, the film blank can also be printed with an offset printing device, a screen printing or a gravure printing device.

It is furthermore preferred here if, after the printing, a covering film composed of electrically insulating material is applied to, preferably is adhesively bonded onto, the printed side of the film. The covering film serves for protecting the strip conductors and for protecting against the strip conductors.

According to a further preferred embodiment, a plurality of insulating panels are provided and, after the film is fastened, are joined together to form an insulating panel assembly in such a manner that the inner surfaces of the individual insulating panels with the films fastened thereto form a common surface, wherein the electric strip conductors of adjacent films are subsequently connected, e.g. by plug connections. This joining together can either already take place outside the fuselage structure or only inside the fuselage structure, for example during the attaching of the insulating panels to the inner side of the fuselage structure. The insulating panels can thereby be assembled simply and rapidly, and large parts of the fuselage structure can be uniformly covered.

According to an alternative embodiment, a plurality of insulating panels are provided and, before the film is fastened, are joined together to form an insulating panel assembly in such a manner that the inner surfaces of the individual insulating panels form a common surface, wherein a common film which is provided with electric strip conductors is subsequently fastened to the common surface. The common film preferably extends over the entire common surface, but at least over and beyond a plurality of insulating panels. The attaching of the insulating panels in the fuselage structure can thereby largely be set up outside the fuselage structure and can thus be greatly simplified and accelerated.

It is particularly preferred here if the insulating panel assembly, during the joining-together outside the fuselage structure, is supported on a supporting trolley and, for the attaching to the inner side of the fuselage structure, is pushed into the fuselage structure with the aid of the supporting trolley. Such a supporting trolley considerably simplifies the setting up and attaching of the insulating panel assembly in the fuselage structure.

Furthermore, it is particularly preferred if the insulating panels have connecting devices with which adjacent insulating panels can be connected to one another. Such connecting devices can be, for example, plug-in connecting devices, wherein a projection or a tab on one insulating panel engages in a recess or an eye in another insulating panel, possibly even over and beyond a frame of the fuselage structure. Further examples of connecting devices are touch and close fastener strips or bonding agents, such as adhesive or adhesive tape.

According to a further preferred embodiment, the interior of the insulating panel has ventilation lines or recesses for ventilation lines. Such ventilation lines can be, for example, pipes or hoses for air conditioning systems, e.g. ATA 21 ventilation lines. The ventilation lines can thereby be integrated in the insulating panels and do not have to be provided and mounted especially, and therefore the production of the aircraft fuselage is simplified and accelerated.

According to yet another preferred embodiment, the insulating panel extends between a horizontal longitudinal direction, a circumferential direction perpendicular to the longitudinal direction and a thickness direction perpendicular to the longitudinal direction and to the circumferential direction. The dimensioning of the insulating panel in the longitudinal direction corresponds to the distance between two adjacent frames of the fuselage structure. One insulating panel can thereby be fastened between two frames.

A multiplicity of insulating panels preferably follow one another in the circumferential direction, with, for example, a first insulating panel extending over a floor section, a second insulating panel extending over a window section, a third insulating panel extending over a luggage compartment section and a fourth insulating panel extending over a ceiling section. The insulating panels can thereby be largely produced as identical parts.

A further aspect of the present disclosure relates to an insulating panel for insulating an aircraft fuselage or the associated fuselage structure, in particular against cold and noise. The insulating panel is formed from an insulating material, such as rigid foam. The insulating panel extends between a horizontal longitudinal direction, a circumferential direction perpendicular to the longitudinal direction and a thickness direction perpendicular to the longitudinal direction and to the circumferential direction. The insulating panel is preferably curved in such a manner that the inner surface is formed concavely and the outer surface is formed convexly. The dimensioning of the insulating panel in the longitudinal direction preferably corresponds to the distance between two adjacent frames of a fuselage structure of the aircraft fuselage to be insulated with the insulating panel. The insulating panel has an inner surface and an outer surface lying opposite each other in the thickness direction. The insulating panel is configured to be fastened with the outer surface to the inner side of a fuselage structure of the aircraft fuselage. A film which is provided, in particular printed, with electric strip conductors is fastened to the inner surface.

According to a preferred embodiment, the insulating panel has connecting devices with which the insulating panel can be connected to a further insulating panel. Such connecting devices can be, for example, plug-in connecting devices, wherein a projection or a tab on one insulating panel can engage in a recess or an eye in another insulating panel. Further examples of connecting devices are touch and close fastener strips or bonding agents, such as adhesive or adhesive tape.

According to a further preferred embodiment, the interior of the insulating panel has ventilation lines or recesses for ventilation lines. Such ventilation lines can be in particular pipes or hoses for air conditioning systems, such as, for example, ATA 21 ventilation lines. The ventilation lines are thereby integrated in the insulating panels and do not have to be provided especially, and therefore the insulation of the aircraft fuselage can be simplified and accelerated.

A further aspect of the present disclosure relates to an aircraft, such as, for example, an aeroplane or a helicopter. The aircraft comprises either an aircraft fuselage which has been produced according to one embodiment of the previously described method, or an insulating panel according to one of the previously described embodiments. The features and advantages mentioned previously in connection with the method and the insulating panel also apply of course to the present aircraft.

BRIEF DESCRIPTION OF THE DRAWINGS

Exemplary embodiments of the present disclosure will be explained in more detail below with reference to a drawing. In the drawings.

DETAILED DESCRIPTION

Figure 1:
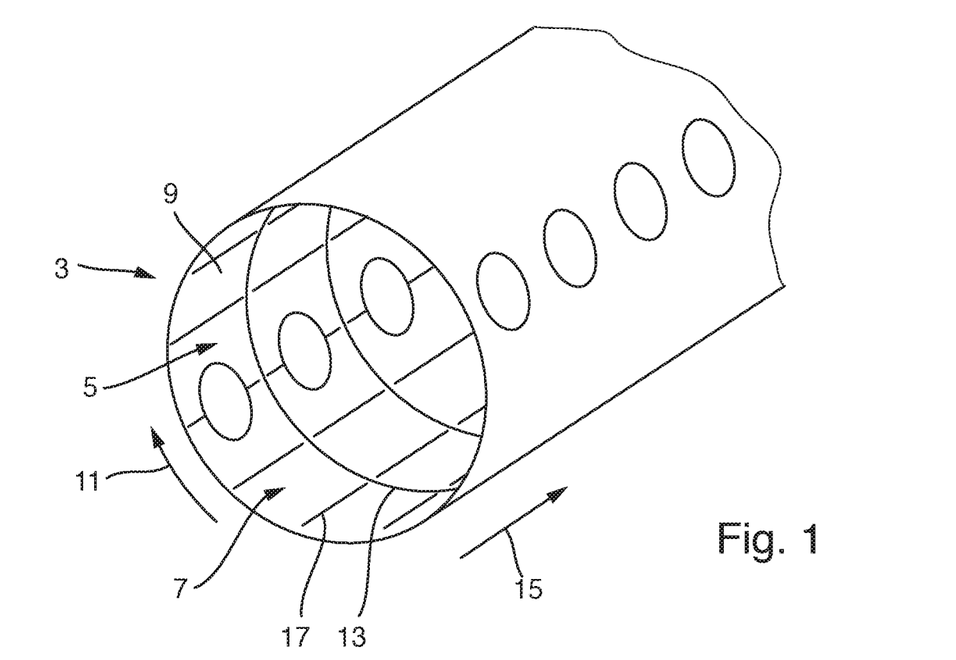
FIG. 1 shows a perspective illustration of a fuselage structure according to an exemplary embodiment of the present disclosure.

According to the method according to the disclosure herein for producing an aircraft fuselage 1, first of all a fuselage structure 3 which surrounds an interior space 5 and has an inner side 7 facing the interior space 5 is provided, as shown in FIG. 1. The fuselage structure 3 has an outer skin 9, and also frames 13 running in a circumferential direction 11 and stringers 17 running in a longitudinal direction 15 for supporting the outer skin 9 on the inner side 7.

Figure 2:
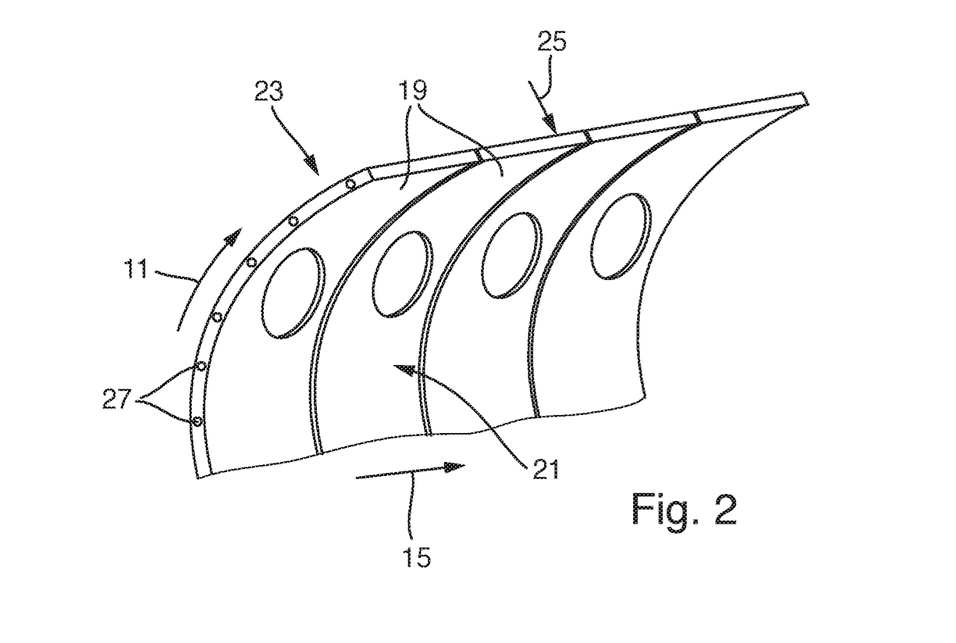
FIG. 2 shows a perspective illustration of a series of insulating panels according to an embodiment of the disclosure herein.

As shown in FIG. 2, a multiplicity of insulating panels 19 composed of rigid foam are furthermore provided. The insulating panels 19 have an inner surface 21 and an outer surface 23 and are curved in such a manner that the inner surface 21 is formed concavely and the outer surface 23 is formed convexly. The insulating panels 19 extend between a horizontal longitudinal direction 15, a circumferential direction 11 perpendicular to the longitudinal direction 15 and a thickness direction 25 perpendicular to the longitudinal direction 15 and to the circumferential direction 11. The dimensioning of the individual insulating panels 19 in the longitudinal direction 15 corresponds to the distance between two adjacent frames 13 of the fuselage structure 3, and therefore one insulating panel 19 can in each case be fastened between two frames 13. Furthermore, the interior of the insulating panel 19 has ventilation lines 27, for example ATA 21 ventilation lines.

Figure 3A:
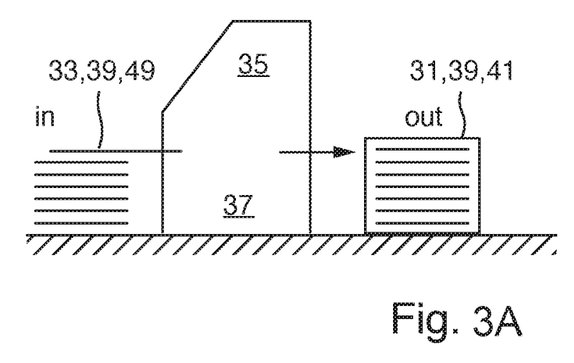
FIGS. 3A and 3B show schematic illustrations of methods for producing a film which is provided with electric strip conductors.
Figure 3B:
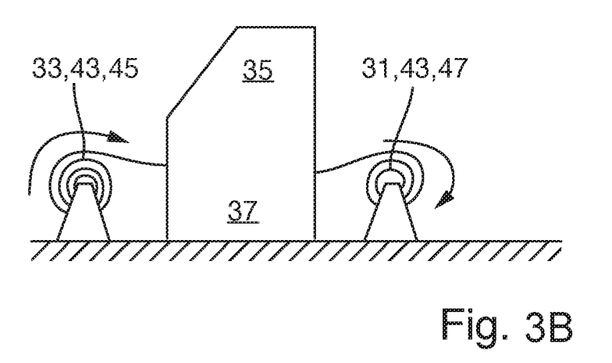

In addition, a film 31 which is provided with electric strip conductors 29 is provided. As shown in FIGS. 3A and 3B, the film 31 which is provided with electric strip conductors 29 is produced by a film blank 33 composed of electrically insulating material being printed with electric strip conductors 29. The printing takes place with the aid of an inkjet printing device 35, wherein particles of an electrically conductive material and particles of an electrically insulating material are applied to the film blank 33 in a predetermined pattern and are subsequently fixed by a laser sintering device 37, i.e. are connected to one another and cured. In this case, either pre-cut film sections 39 from a stack 41 can be introduced into the inkjet printing device 35, as shown in FIG. 3A, or a continuous film 43 can be unrolled from a reel 45, guided through the inkjet printing device 35 and subsequently rolled up again on another reel 47, as is illustrated in FIG. 3B. After the printing, a covering film 49 composed of electrically insulating material is adhesively bonded onto the printed side of the film 31.

Figure 4:
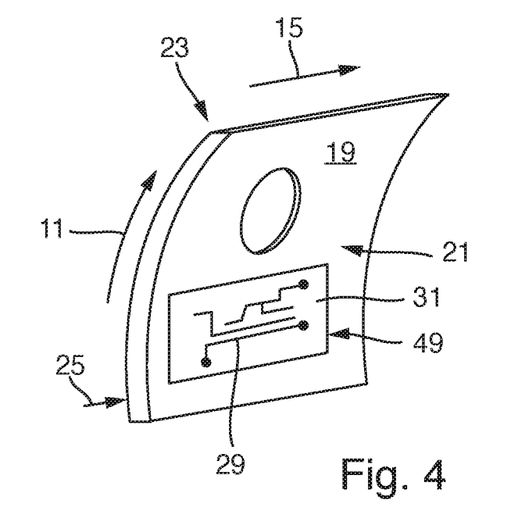
FIG. 4 shows a perspective illustration of an insulating panel with a film which is fastened thereto and has electric strip conductors.

As illustrated in FIG. 4, the film 31 is fastened to, for example adhesively bonded onto, the inner surface 21 of the insulating panels 19. Subsequently, the insulating panel 19 which is provided with the film 31 is attached to the inner side 7 of the fuselage structure 3.

Figure 5:
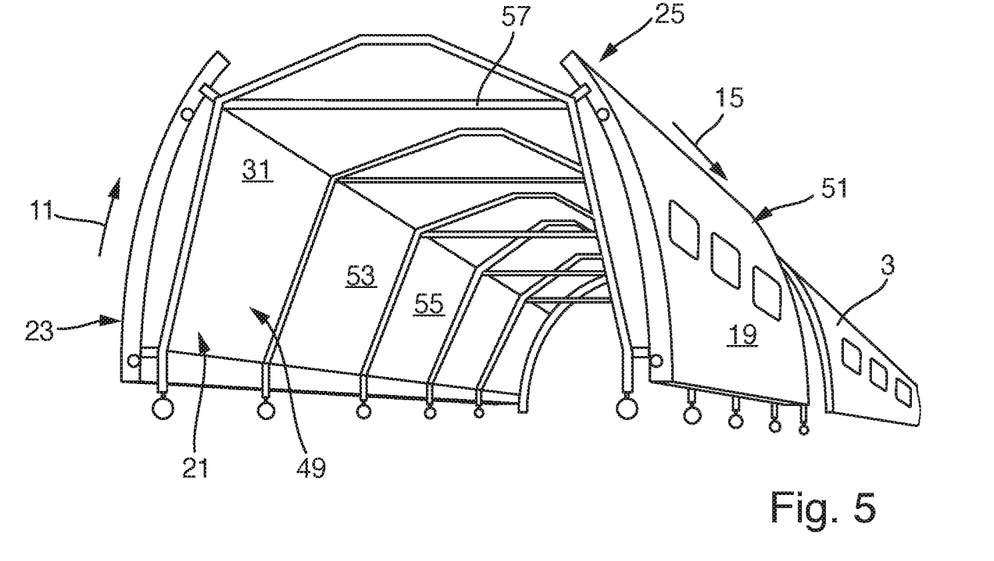
FIG. 5 shows a perspective illustration of an insulating panel assembly fastened to a supporting trolley.

In the embodiment illustrated, before the film 31 is fastened, the individual insulating panels 19 are joined together to form an insulating panel assembly 51, specifically in such a manner that the inner surfaces 21 of the individual insulating panels 19 form a common surface 53. A common film 55 which is provided with electric strip conductors 29 is subsequently fastened to the common surface 53. The common film 55 extends here over the entire common surface 53. As shown in FIG. 5, the insulating panel assembly 51, during the joining together outside the fuselage structure 3, is supported on a supporting trolley 57 and, with the attaching to the inner side 7 of the fuselage structure 3, is pushed into the fuselage structure 3 with the aid of the supporting trolley 57.

As an alternative to the embodiment illustrated, it is also possible, however, for the film 31 to be fastened to the insulating panels 19 before the latter are joined together, that is to say that, after the film 31 is fastened, the individual insulating panels 19 are joined together to form an insulating panel assembly 51 in such a manner that the inner surfaces 21 of the individual insulating panels 19 with the films 31 fastened thereto form a common surface 53, after which the electric strip conductors 29 of adjacent films 31 are then connected, for example by plug connections. This joining together can either take place already outside the fuselage structure 3 or only inside the fuselage structure 3, for example during the attaching of the insulating panels 19 to the inner side 7 of the fuselage structure 3.

Figure 6:
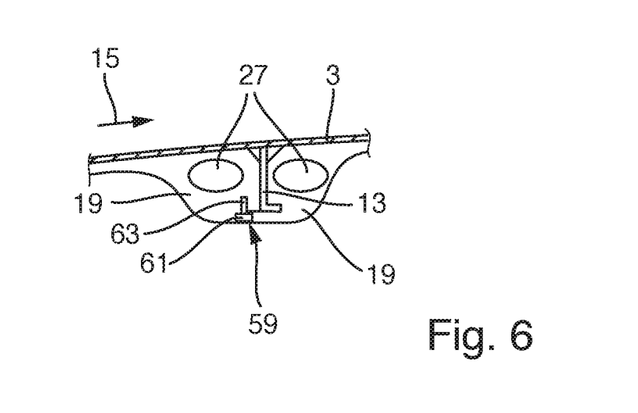
FIG. 6 shows a cross-sectional detailed view of two insulating panels which are attached to the inner side of a fuselage structure and are connected to each other via connecting devices.

In order to facilitate the joining together of the insulating panels 19, the insulating panels 19 can have connecting devices 59 with which adjacent insulating panels 19 can be connected to one another. As illustrated in FIG. 6, such connecting devices 59 can be, for example, plug-in connecting devices, wherein a projection 61 or a tab on one insulating panel 19 engages in a recess 63 or an eye in another adjacent insulating panel 19. Such connecting devices 59 can even reach over and beyond a frame 13 of the fuselage structure 3.

Figure 7A:
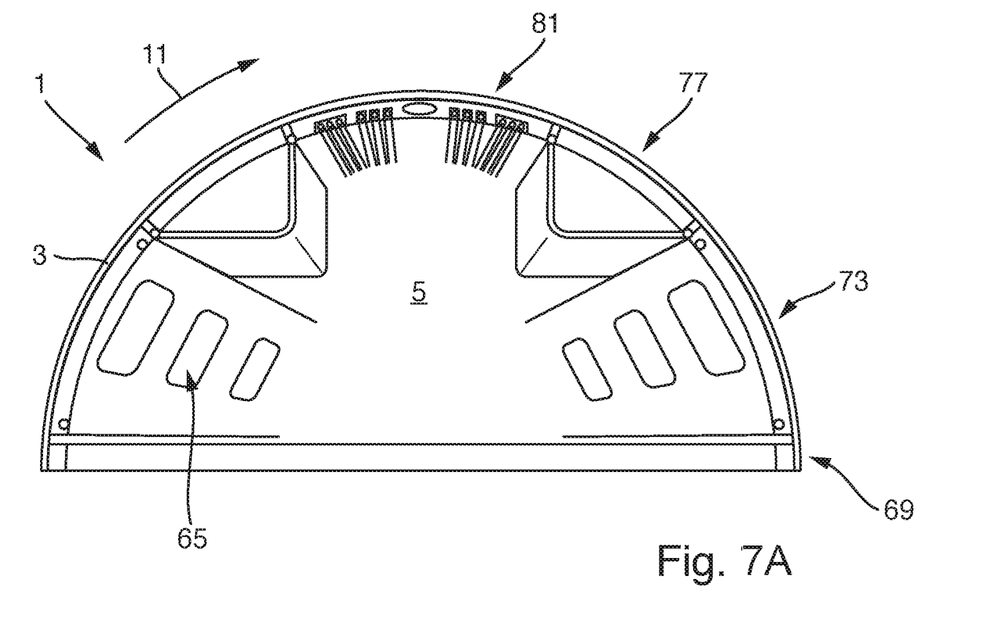
FIGS. 7A and 7B show cross-sectional views of an aircraft fuselage and an assignment of insulating panels to certain regions in the circumferential direction.
Figure 7B:
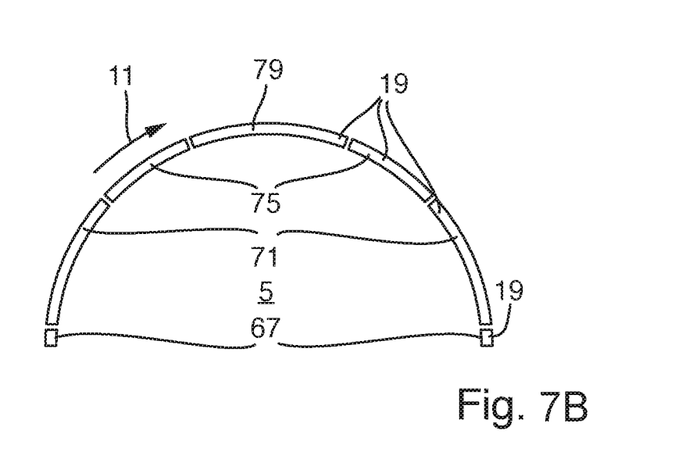

After the insulating panel 19 is attached to the inner side 7 of the fuselage structure 3, a cabin wall segment 65 is attached to the inner side 7 of the fuselage structure 3 in such a manner that the insulating panel 19 extends between the fuselage structure 3 and the cabin wall segment 65, as is illustrated in FIG. 7A. A plurality of insulating panels 19 follow one another here in the circumferential direction 11, as shown in FIG. 7B with a first insulating panel 67 extending over a floor section 69, a second insulating panel 71 extending over a window section 73, a third insulating panel 75 extending over a luggage compartment section 77 and a fourth insulating panel 79 extending over a ceiling section 81.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing an aircraft fuselage, the method comprising:
    providing a fuselage structure, which surrounds an interior space and has an inner side facing the interior space;
    providing a plurality of insulating panels, wherein each insulating panel of the plurality of insulating panels has an inner surface and an outer surface;
    fastening a film, which comprises electric strip conductors, to the inner surface of at least one of the plurality of insulating panels;
    providing the plurality of insulating panels with connecting devices;
    attaching the plurality of insulating panels to the inner side of the fuselage structure for insulating the fuselage structure; and
    connecting, using the connecting devices, adjacent insulating panels of the plurality of insulating panels to one another.

2. The method according to claim 1, comprising, after the plurality of insulating panels are attached to the inner side of the fuselage structure, attaching a cabin wall segment to the inner side of the fuselage structure such that the plurality of insulating panels extends between the fuselage structure and the cabin wall segment.

3. The method according to claim 1, wherein the film is provided by a film blank comprising electrically insulating material printed with the electric strip conductors.

4. The method according to claim 3, wherein the printing takes place with an inkjet printing device, wherein particles of an electrically conductive material and particles of an electrically insulating material are applied to the film blank in a predetermined pattern and subsequently fixed.

5. The method according to claim 3, wherein, after the printing, a covering film is applied to a printed side of the film.

6. The method according to claim 1, comprising:
joining, after the film is fastened to one or more of the plurality of insulating panels, the plurality of insulating panels together to form an insulating panel assembly, such that the inner surfaces of the insulating panels form a common surface; and
connecting the electric strip conductors of adjacent films together after the plurality of insulating panels are joined together.

7. The method according to claim 6, wherein the plurality of insulating panels are joined together to form the insulating panel assembly outside of the fuselage structure, the method comprising:
supporting the plurality of insulating panels on a supporting trolley while the plurality of insulating panels are joined together to form the insulating panel assembly; and
using the supporting trolley to push the insulating panel assembly into the fuselage structure for attachment to the inner side of the fuselage.

8. The method according to claim 6, wherein:
the plurality of insulating panels comprises at least a first insulating panel and a second insulating panel that are adjacent to each other; and
at least some of the connecting devices comprise a projection on the first insulating panel and a corresponding recess on the second insulating panel; the method comprising engaging each projection first insulating panel in the corresponding recess of the second insulating panel to secure the first insulating panel to the second insulating panel.

9. The method according to claim 1, comprising, before the film is fastened, joining the plurality of insulating panels together to form an insulating panel assembly such that the inner surfaces of individual insulating panels of the plurality of insulating panels form a common surface, wherein the film is a common film that is subsequently fastened to the common surface.

10. The method according to claim 1, wherein ventilation lines, or recesses for ventilation lines, are formed in an interior of one or more of the plurality of insulating panels.

11. The method according to claim 1, wherein each of the plurality of insulating panels extends between a longitudinal direction, a circumferential direction, and a thickness direction, wherein a dimension of the plurality of insulating panels in the longitudinal direction corresponds to a distance between two adjacent frames of the fuselage structure.

12. An insulating panel assembly for insulating an aircraft fuselage, the insulating panel assembly comprising:
a plurality of insulating panels, each of which comprises:
an inner surface and an outer surface, which are opposite each other in a thickness direction of the insulating panel;
a film comprising electric strip conductors, wherein the film is fastened to the inner surface of the insulating panel; and
connecting devices;
wherein each of the plurality of insulating panels extends in a longitudinal direction, a circumferential direction, and the thickness direction;
wherein adjacent insulating panels of the plurality of insulating panels are connected together, via the connecting devices associated with the adjacent insulating panels, to form the insulating panel assembly; and
wherein the insulating panel assembly is configured for fastening to a fuselage structure of the aircraft fuselage by attaching the outer surface of each of the plurality of insulating panels to an inner surface of the fuselage structure of the aircraft fuselage.

13. The insulating panel according to claim 12, wherein:
the plurality of insulating panels comprises at least a first insulating panel and a second insulating panel that are adjacent to each other;
at least some of the connecting devices comprise a projection on the first insulating panel and a corresponding recess on the second insulating panel;
each projection of the first insulating panel is configured to engage in the corresponding recess of the second insulating panel to secure the first insulating panel to the second insulating panel.

14. The insulating panel according to claim 12, wherein ventilation lines, or recesses for ventilation lines, are formed in an interior of one or more of the plurality of insulating panels.

15. An aircraft comprising an aircraft fuselage, the aircraft fuselage comprising:
a fuselage structure which surrounds an interior space and has an inner side facing the interior space; and
a plurality of insulating panels for insulating the fuselage structure, each of the plurality of insulating panels comprising:
an inner surface and an outer surface, which are opposite each other in a thickness direction of the insulating panel; and
a film comprising electric strip conductors, wherein the film is fastened to the inner surface of the insulating panel; and
connecting devices;
wherein adjacent insulating panels of the plurality of insulating panels are connected together, via the connecting devices associated with the adjacent insulating panels, to form the insulating panel assembly; and
wherein each of the plurality of insulating panels is fastened to the fuselage structure, such that the outer surface of each of the plurality of insulating panels is attached to the inner side of the fuselage structure.

16. An aircraft comprising an aircraft fuselage having an insulating panel assembly for insulating the aircraft fuselage, the insulating panel assembly comprising:
a plurality of insulating panels, each of which comprises:
an inner surface and an outer surface, which are opposite each other in a thickness direction of the insulating panel; and
a film comprising electric strip conductors, wherein the film is fastened to the inner surface of the insulating panel; and
connecting devices;
wherein each of the plurality of insulating panels extends in a longitudinal direction, a circumferential direction, and the thickness direction;
wherein adjacent insulating panels of the plurality of insulating panels are connected together, via the connecting devices associated with the adjacent insulating panels, to form the insulating panel assembly; and
wherein the insulating panel assembly is configured for fastening to a fuselage structure of the aircraft fuselage by attaching the outer surface of each of the plurality of insulating panels to an inner surface of the fuselage structure of the aircraft fuselage.

* * * * *